(12) United States Patent
Shao et al.

(10) Patent No.: US 12,175,866 B2
(45) Date of Patent: Dec. 24, 2024

(54) METHODS FOR SETTING TIME OF TRAFFIC LIGHTS IN SMART CITY AND INTERNET OF THINGS SYSTEMS THEREOF

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Junyan Zhou, Chengdu (CN); Yaqiang Quan, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 77 days.

(21) Appl. No.: 18/183,933

(22) Filed: Mar. 14, 2023

(65) Prior Publication Data

US 2023/0222906 A1    Jul. 13, 2023

(30) Foreign Application Priority Data

Dec. 19, 2022  (CN) .......................... 202211631962.8

(51) Int. Cl.
*G08G 1/095* (2006.01)
*G06V 20/52* (2022.01)

(52) U.S. Cl.
CPC ............. *G08G 1/095* (2013.01); *G06V 20/53* (2022.01)

(58) Field of Classification Search
CPC ............................... G08G 1/095; G06V 20/53
See application file for complete search history.

(56) References Cited

U.S. PATENT DOCUMENTS

| | | | | |
|---|---|---|---|---|
| 7,864,072 B2* | 1/2011 | Basson | .................. | G08G 1/005 |
| | | | | 701/25 |
| 9,965,951 B1* | 5/2018 | Gallagher | .............. | G08G 1/065 |
| 10,573,172 B2* | 2/2020 | Vala | ...................... | G08G 1/0145 |
| 10,956,423 B2* | 3/2021 | Singh | ...................... | H04L 43/18 |

(Continued)

FOREIGN PATENT DOCUMENTS

| | | |
|---|---|---|
| CN | 101593432 A | 12/2009 |
| CN | 108417057 A | 8/2018 |

(Continued)

*Primary Examiner* — John A Tweel, Jr.
(74) *Attorney, Agent, or Firm* — METIS IP LLC (57) ABSTRACT

The embodiment of the present disclosure provides a method for setting time of traffic lights in a smart city and an Internet of Things system. The method is implemented by an Internet of Things system for setting time of traffic lights in a smart city, which includes a user platform, a service platform, a management platform, a sensor network platform, and an object platform. The method includes: obtaining pedestrian information and intersection information of a target intersection, and the target intersection being an intersection provided with the traffic lights; determining, based on the pedestrian information and the intersection information, the scheme for setting time of the traffic lights at the target intersection; and sending a control instruction corresponding to the scheme for setting the time to the object platform, and in response to the received control instruction, controlling lighting duration of the traffic lights by the object platform.

19 Claims, 6 Drawing Sheets

(56) References Cited

U.S. PATENT DOCUMENTS

2015/0029039 A1\* 1/2015 Mukaiyama ....... G08G 1/09675
340/905
2018/0096595 A1\* 4/2018 Janzen ................... G06V 10/94
2023/0069402 A1 3/2023 Shao et al.

FOREIGN PATENT DOCUMENTS

| CN | 111798675 A | 10/2020 |
| CN | 114613159 A | 6/2022 |

\* cited by examiner

```
┌─────────────────────────────────────────────────────────────┐
│  Obtaining pedestrian information and intersection          │
│  information of a target intersection through the sensor    │─ 210
│  network platform based on the object platform, and the     │
│  target intersection being an intersection provided with    │
│  the traffic lights                                         │
└─────────────────────────────────────────────────────────────┘
                              │
                              ▼
┌─────────────────────────────────────────────────────────────┐
│  Determining, based on the pedestrian information and the   │
│  intersection information, a scheme for setting time of the │─ 220
│  traffic lights at the target intersection                  │
└─────────────────────────────────────────────────────────────┘
                              │
                              ▼
┌─────────────────────────────────────────────────────────────┐
│  Sending a control instruction corresponding to the scheme  │
│  for setting the time to the object platform through the    │
│  sensor network platform, and in response to the received   │─ 230
│  control instruction, controlling lighting duration of the  │
│  traffic lights by the object platform                      │
└─────────────────────────────────────────────────────────────┘
```

┌─────────────────────────────────────────────────────┐
│ Determining, based on the real-time image of the at least one │
│ frame, a first count of pedestrians to be determined through a │  ── 310
│ pedestrian recognition model, wherein the pedestrian recognition │
│ model is a machine learning model │
└─────────────────────────────────────────────────────┘
                          ↓
┌─────────────────────────────────────────────────────┐
│ Determining, based on the multi-frame historical images, the │
│ second count of pedestrians to be determined through the first │  ── 320
│ pedestrian prediction model, wherein the first pedestrian │
│ prediction model is a machine learning model │
└─────────────────────────────────────────────────────┘
                          ↓
┌─────────────────────────────────────────────────────┐
│ Determining the count of current pedestrians based on the first │
│ count of pedestrians to be determined and the second count of │  ── 330
│ pedestrians to be determined │
└─────────────────────────────────────────────────────┘

METHODS FOR SETTING TIME OF TRAFFIC LIGHTS IN SMART CITY AND INTERNET OF THINGS SYSTEMS THEREOF

CROSS-REFERENCE TO RELATED APPLICATIONS

This application claims priority to Chinese Patent Application No. 202211631962.8, filed on Dec. 19, 2022, the entire contents of which are incorporated herein by reference.

TECHNICAL FIELD

The present disclosure relates to the field of traffic lights, and in particular, to a method for setting time of traffic lights in a smart city and an Internet of Things system.

BACKGROUND

Traffic lights play an important role in an orderly operation of city traffic, and a normal operation of the traffic lights usually affects traffic conditions at each intersection in the city.

Therefore, it is hoped to provide a method for setting time of traffic lights in a smart city and an Internet of Things system, which can optimize the time setting of the traffic lights, thereby maximizing a passing rate of vehicles and/or pedestrians, avoiding traffic congestion, and ensuring a smooth flow of city traffic.

SUMMARY

One or more embodiments of the present disclosure provide a method for setting time of traffic lights in a smart city. The method is implemented by an Internet of Things system for setting time of traffic lights in a smart city, which includes a user platform, a service platform, a management platform, a sensor network platform, and an object platform. The method is executed by the management platform, including: obtaining pedestrian information and intersection information of a target intersection through the sensor network platform based on the object platform, and the target intersection being an intersection provided with traffic lights; determining, based on the pedestrian information and intersection information, a scheme for setting time of traffic lights at the target intersection; and sending a control instruction corresponding to the scheme for setting the time to the object platform through the sensor network platform, and in response to received control instruction, controlling lighting duration of the traffic lights by the object platform.

One or more embodiments of the present disclosure provide an Internet of Things system for setting the time of traffic lights in a smart city. The Internet of Things system includes a user platform, a service platform, a management platform, a sensor network platform, and an object platform. The management platform is configured to: obtain pedestrian information and intersection information of a target intersection through the sensor network platform based on the object platform, and the target intersection being an intersection provided with traffic lights; determine, based on pedestrian information and the intersection information, a scheme for setting time of the traffic lights at the target intersection; and send a control instruction corresponding to the scheme for setting the time to the object platform through the sensor network platform; and in response to received control instruction, the object platform is configured to control lighting duration of the traffic lights.

One or more embodiments of the present disclosure provide a non-transitory computer-readable storage medium. The storage medium stores computer instructions. When reading the computer instructions in the storage medium, a computer executes the method for setting the time of traffic lights in the smart city.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The present disclosure is further described in terms of exemplary embodiments. These exemplary embodiments are described in detail with reference to the drawings. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system", "device", "unit", and/or "module" used herein are one method to distinguish different components, elements, parts, sections, or assemblies of different levels in ascending order. However, the terms may be displaced by other expressions if they may achieve the same purpose.

As shown in the present disclosure and claims, unless the context clearly prompts the exception, "a", "one", and/or "the" is not specifically singular, and the plural may be included. It will be further understood that the terms "comprise," "comprises," and/or "comprising," "include," "includes," and/or "including," when used in the present disclosure, specify the presence of stated steps and elements, but do not preclude the presence or addition of one or more other steps and elements thereof.

The flowcharts are used in present disclosure to illustrate the operations performed by the system according to the embodiment of the present disclosure. It should be understood that the foregoing or following operations may not necessarily be performed exactly in order. Instead, the operations may be processed in reverse order or simultaneously. Moreover, one or more other operations may be added to the flowcharts. One or more operations may be removed from the flowcharts.

Figure 1:
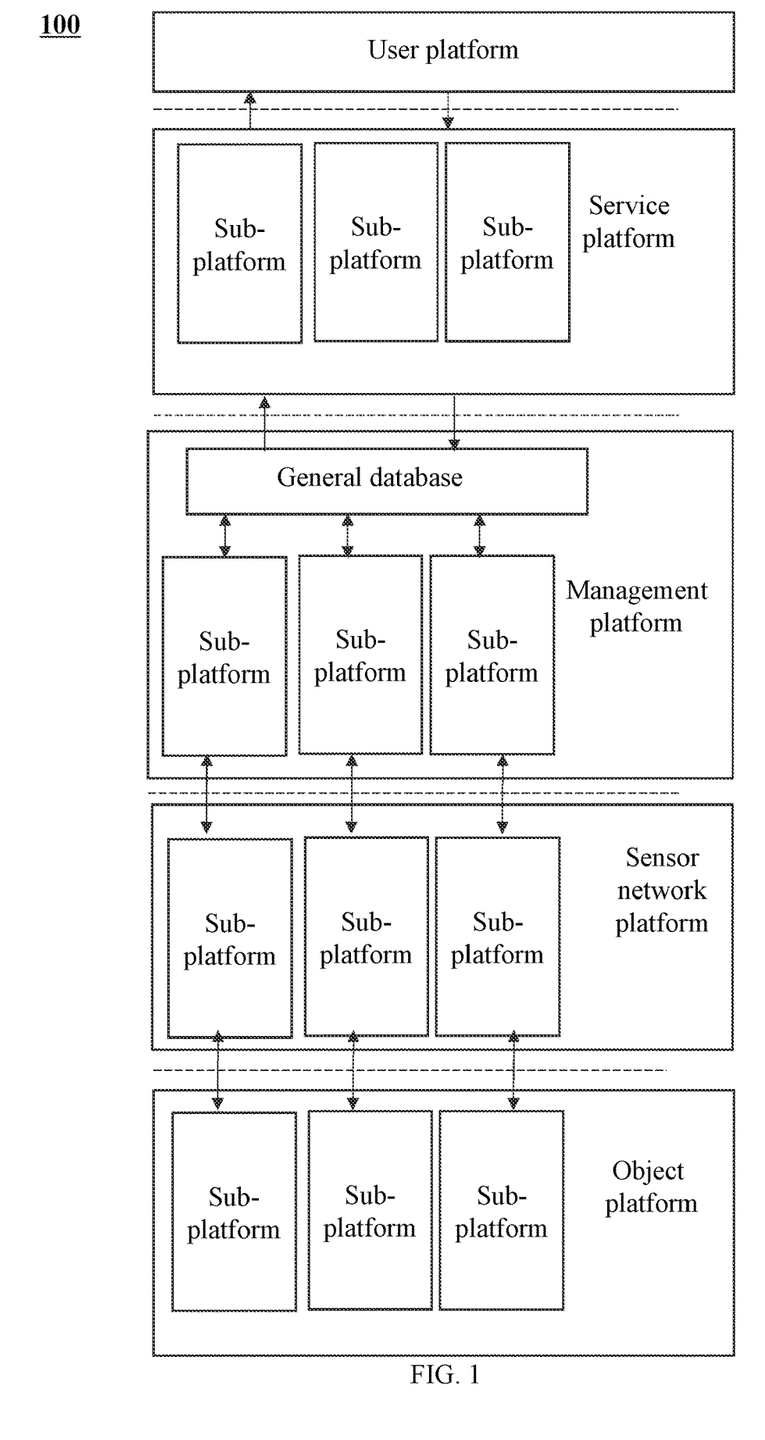
FIG. 1 is an exemplary schematic diagram of an Internet of Things system for setting time of traffic lights in a smart city according to some embodiments of the present disclosure.

FIG. 1 is an exemplary schematic diagram of an Internet of Things system for setting time of traffic lights in a smart city according to some embodiments of the present disclosure.

It should be understood that the Internet of Things system for setting the time of traffic lights in the smart city may be implemented in various ways. As shown in FIG. 1, the Internet of Things system for setting the time of traffic lights in the smart city includes a user platform, a service platform, a management platform, a sensor network platform, and an object platform. In some embodiments, the Internet of Things system for setting the time of traffic lights in the smart city may be part of a processing device or implemented by the processing device.

The user platform may refer to a user-led platform. In some embodiments, the user platform may be configured as a terminal device. In some embodiments, the user platform may inquire about the scheme for setting the time of the traffic lights at each intersection in each city area by obtaining instructions input by a user through a terminal. In some embodiments, the city area may be determined according to an administrative area of the city, or flexibly determined according to preset rules, real-time traffic flow data, etc., and each city area may include various intersections within the city area. For example, road segments corresponding to all commercial office districts in the city may be divided into the same area during rush hours. As another example, all congested road segments in the city may be divided into the same area according to a real-time situation of congestion. In some embodiments, the user platform may issue a query instruction of the scheme for setting the time to the service platform, receive the scheme for setting the time uploaded by the service platform, and feed back the scheme to the user.

The service platform may refer to a platform that may provide input and output services for the user. In some embodiments, the service platform may adopt an independent arrangement. The independent arrangement means that the platform includes a plurality of independent sub-platforms, which operate and process data independently, and directly interact with upper and lower functional platforms for data interaction. In some embodiments, the service platform may be divided into a plurality of independent sub-platforms according to city areas. In some embodiments, the sub-platform of the service platform may receive the query instruction of the scheme for setting the time issued by the user platform, and transmit the query instruction to the management platform. The sub-platform of the service platform may also receive the scheme for setting the time uploaded by the management platform, and transmit the scheme for setting the time to the user platform, or the like.

The management platform may refer to a platform that coordinates the connection and collaboration between various functional platforms, and gathers all the information of the Internet of Things system for setting the time of the traffic lights in the smart city. The management platform may provide functions such as perception management and control management for the Internet of Things system for setting the time of the traffic lights in the smart city. In some embodiments, the management platform may be a remote platform controlled by a manager, artificial intelligence, or a preset rule. In some embodiments, the management platform may adopt an independent arrangement. The management platform may be provided with a general database and a plurality of sub-platforms, wherein each sub-platform may include its own database. In some embodiments, the management sub-platform may correspond to each city area, and has a one-to-one correspondence with the service sub-platform. The plurality of sub-platforms respectively store and process data of different city areas sent by the sensor network platform. The general database stores and processes the data of the plurality of sub-platforms after summarizing. In some embodiments, the management sub-platform may receive the query instruction of the scheme for setting the time issued by a corresponding service sub-platform, and upload the scheme for setting the time to the service sub-platform. The management sub-platform may also issue a query instruction of pedestrian information and intersection information to the sensor network platform, and receive the pedestrian information and the intersection information uploaded by the sensor network platform for analysis and processing to determine the scheme for setting the time.

The sensor network platform may refer to a functional platform for managing sensor communication. The sensor network platform may realize the functions of perception information sensor communication and control information sensor communication. In some embodiments, the sensor network platform may adopt an independent arrangement. The sensor network platform may include a plurality of independent sub-platforms. Each sensor network sub-platform may correspond to a city area, and has a one-to-one correspondence with the management sub-platform. In some embodiments, the sensor network platform may be configured as a communication network and a gateway device, and each sensor network sub-platform may be configured as an independent gateway device. In some embodiments, the sensor network sub-platform may obtain the pedestrian information and the intersection information at the intersection from the object platform in a corresponding area. Each sensor network sub-platform may upload the pedestrian information and the intersection information in each area to a corresponding management sub-platform.

The object platform may refer to a functional platform for generating the perceptual information. In some embodiments, the object platform may be configured as various devices to obtain information. The various devices may include devices such as traffic lights, image obtaining devices, pedestrian buttons, etc. Each device is configured with a unique identifier, which may be deployed at intersections in different areas to obtain the pedestrian information and the intersection information at the each intersection. In some embodiments, the object platform may include a plurality of object sub-platforms, and each object sub-platform may correspond to the aforementioned devices in an area. In some embodiments, the object platform sub-platform may receive the instruction of obtaining the pedestrian information and intersection information of the each intersection in the area issued by a corresponding sensor network sub-platform, and upload the pedestrian information and the intersection information of the each intersection in the area to the corresponding sensor network sub-platform. In some embodiments, the sub-platform of the object platform may respond to the received control instruction corresponding to the scheme for setting the time to control the lighting duration of the traffic lights. In some embodiments, the object platform may also directly adjust the lighting duration of the traffic lights or switch the traffic lights based on the pedestrian button configured on the object platform.

Each "service sub-platform-management sub-platform-sensor network sub-platform-object sub-platform" may be an independent branch, parallel and independently process relevant data (such as the pedestrian information, the intersection information, the scheme for setting the time, etc.) of each intersection in a corresponding city area, and independently feed back to the user platform.

In some embodiments, the Internet of Things system for setting the time of the traffic lights in the smart city may be applied to various traffic scenarios such as railways, highways, waterways, and aviation, so as to determine various work schemes including the time setting of traffic lights, traffic control, deployment of relevant staff, and so on. It should be noted that the above scenarios are only examples, and do not limit the present disclosure to application scenarios of the Internet of Things system for setting the time of the traffic lights in the smart city. On the basis of the contents disclosed in this embodiment, those skilled in the art may apply the Internet of Things system for setting the time of the traffic lights in the smart city to any other suitable scenarios.

The following will take a scenario application as an example to describe the Internet of Things system for setting the time of the traffic lights in the smart city.

The management platform may be configured to obtain the pedestrian information and intersection information of the target intersection based on the object platform through the sensor network platform, and the target intersection being an intersection with traffic lights; determine the scheme for setting the time of the traffic lights at the target intersection based on pedestrian information and intersection information; and sending the control instruction corresponding to the scheme for setting the time to the object platform through the sensor network platform. The object platform may be configured to respond to the received control instruction to control the lighting duration of the traffic light. For more information on determining the scheme for setting the time, refer to FIG. 2 and its related descriptions.

In some embodiments, the management platform may also be configured to obtain a target picture of the target intersection through the object platform; and determine the pedestrian information of the target intersection based on an image recognition result of the target picture. For more information on determining the pedestrian information of the target intersection based on the target picture, please refer to FIG. 2 and its related descriptions.

In some embodiments, the object platform includes a pedestrian button disposed near the crosswalk, and the pedestrian button is used to adjust the lighting duration of the traffic lights. For more information about the pedestrian button, please refer to FIG. 2 and its related descriptions.

In some embodiments, the target picture includes a real-time image of at least one frame and multi-frame historical images. The pedestrian information includes a count of current pedestrians. The management platform is configured to determine, based on the real-time image of the at least one frame, a first count of pedestrians to be determined through a pedestrian recognition model, wherein the pedestrian recognition model is a machine learning model. The management platform is further configured to determine, based on the multi-frame historical images, a second count of pedestrians to be determined through a first pedestrian prediction model, wherein the first pedestrian prediction model is a machine learning model. The management platform is further configured to determine the count of current pedestrians based on the first count of pedestrians to be determined and the second count of pedestrians to be determined. For more details on determining the count of current pedestrians, please refer to FIG. 3 and its related descriptions.

In some embodiments, the management platform may also be configured to determine the count of current pedestrians based on a weighted sum of the first count of pedestrians to be determined and the second count of pedestrians to be determined, wherein the weights of the first count of pedestrians to be determined and the second count of pedestrians to be determined are determined based on clarity of the real-time image and the historical images, respectively, and the weights are positively correlated with the clarity. For more details about the weighted summation of the first count of pedestrians to be determined and the second count of pedestrians to be determined, please refer to FIG. 3 and the related descriptions.

In some embodiments, the first pedestrian prediction model may be obtained through training, training samples are a plurality of historical images at a first sample time, a label is an actual count of pedestrians at a second sample time, and the first sample time is earlier than the second sample time. For more instructions on training the first pedestrian prediction model, please refer to FIG. 3 and its related descriptions.

In some embodiments, the pedestrian information also includes a count of pedestrians at a plurality of future time points. For more descriptions on the count of pedestrians at the plurality of future time points, please refer to FIG. 2 and its related descriptions.

In some embodiments, the management platform may also be configured to determine, based on multi-frame historical images of the target picture, the intersection Information, event information, weather information, and a target time period, the count of pedestrians at the plurality of future time points through a second pedestrian prediction model, and the second pedestrian prediction model is a machine learning model. For more details about the second pedestrian prediction model, please refer to FIG. 5 and its related descriptions.

In some embodiments, the management platform may also be configured to determine an update frequency of the scheme for setting the time. For more details on determining the update frequency, please refer to FIG. 2 and its related descriptions.

In some embodiments, the management platform may also be configured to determine, based on the pedestrian information and the intersection information, the scheme for setting the time of the traffic lights at the target intersection through vector matching. For more information on determining the scheme for setting the time through vector matching, please refer to FIG. 6 and its related descriptions.

It should be noted that the above description of the Internet of Things for setting the time of the traffic lights in the smart city is only for convenience of description, and does not limit the present disclosure to the scope of the examples cited. It will be understood that for those skilled in the art, after understanding the principle of the Internet of Things system, it is possible to arbitrarily combine various modules, or form subsystems to connect with other modules without departing from this principle. For example, the management platform, user platform, service platform, sensor network platform, and object platform disclosed in FIG. 1 may be different platforms in one system, or one platform may realize the functions of the above two or more platforms.

Figure 2:
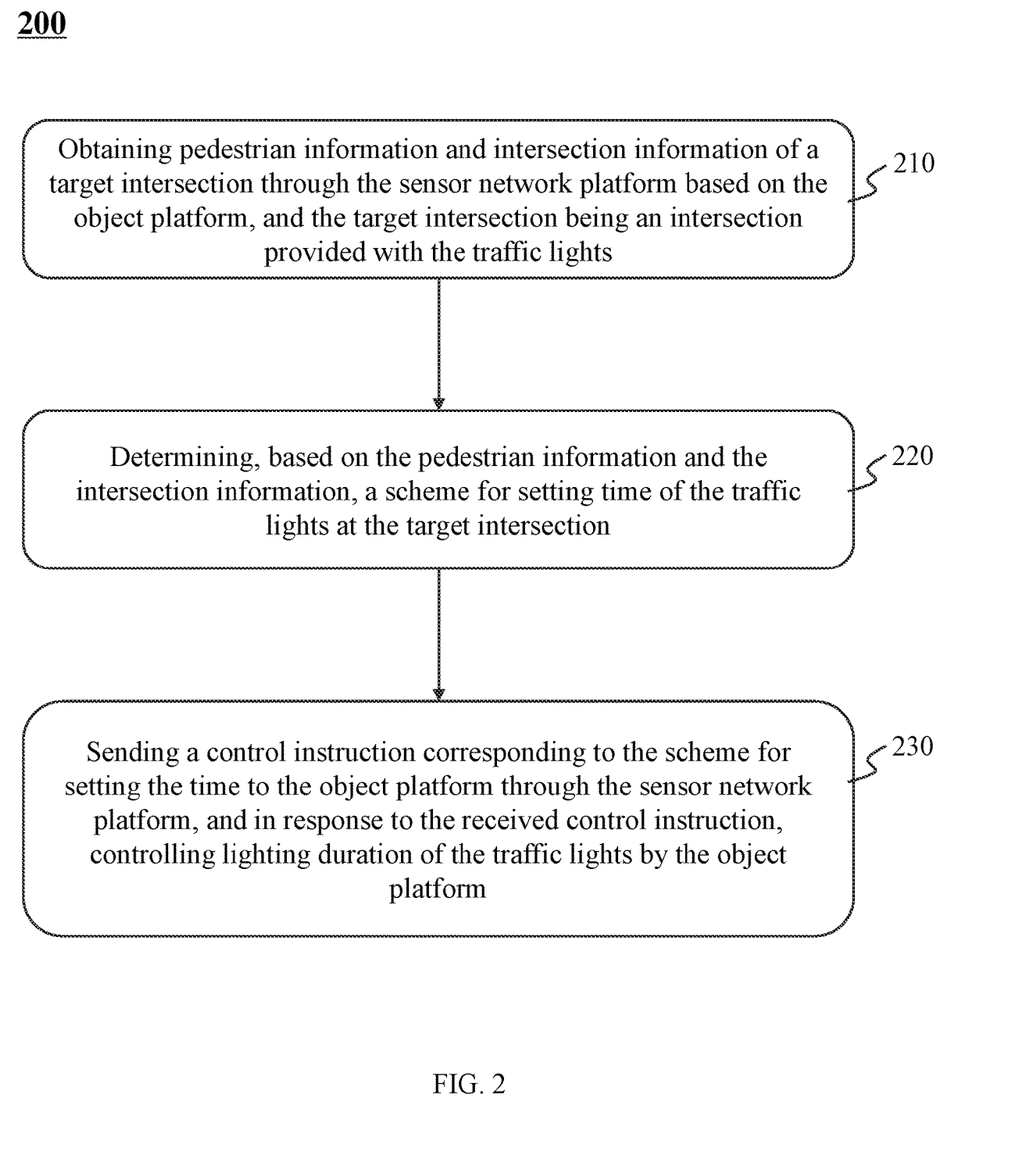
FIG. 2 is an exemplary flowchart of a method for setting time of traffic lights in a smart city according to some embodiments of the present disclosure.

FIG. 2 is an exemplary flowchart of a method for setting time of traffic lights in a smart city according to some embodiments of the present disclosure. As shown in FIG. 2, a process 200 includes the following steps. In some embodiments, the process 200 may be executed by the management platform.

Step 210, obtaining pedestrian information and intersection information of a target intersection through the sensor network platform based on the object platform, and the target intersection being an intersection provided with the traffic lights.

The target intersection is an intersection with traffic lights. For example, the target intersection may be crossroads, intersections near schools, etc.

The pedestrian information refers to information that reflects a situation of pedestrians at the intersection. For example, the pedestrian information may include a count of pedestrians (e.g., 354 people).

In some embodiments, the management platform may obtain the pedestrian information at the target intersection based on the object platform through the sensor network platform. For example, the object platform collects the pedestrian information based on information collection terminals (e.g., an image obtaining device, etc.). The management platform may issue an instruction of obtaining intersection information to the sensor network platform. The sensor network platform issues the instruction to the object platform. The object platform sends the intersection information to the sensor network platform in response to the instruction. The management platform may receive the pedestrian information uploaded by the sensor network platform.

In some embodiments, the management platform may obtain a target picture of the target intersection through the object platform; and determine the pedestrian information at the target intersection based on an image recognition result of the target picture.

The target picture refers to an image used to determine the pedestrian information at the target intersection (e.g., a RGB image, a grayscale image, and an infrared image, etc.). There may be one or more pedestrians at the target intersection in the target picture.

In some embodiments, the target picture includes a real-time image of at least one frame and multi-frame historical images. For example, the current time is 15:00, and the target picture may include an image corresponding to 15:00 and images corresponding to 14:55, 14:56, 14:57, 14:58, and 14:59, respectively.

In some embodiments, the object platform may include an image obtaining device (such as a surveillance camera, a drone, etc.) disposed at the intersection. The management platform may obtain the target picture collected by the image obtaining device on the object platform through the sensor network platform.

In some embodiments, the object platform may further include a pedestrian button disposed near the crosswalk. The pedestrian button may be used to adjust the lighting duration of the traffic lights (e.g., extend the lighting duration of the green light by 5 seconds) or switch the traffic lights (e.g., switch the red light to the green light or switch the green light to the red light). When a pedestrian wants to cross the crosswalk, the pedestrian may press the pedestrian button to dynamically adjust the lighting duration of the traffic lights or switch the traffic lights.

In some embodiments, the pedestrian button may be used at some specific intersections, for example, intersections with fewer pedestrians but greater traffic flow. It should be understood that if the crosswalk at a certain intersection is unoccupied for a long time, there is no need to change the traffic lights alternately, which is convenient for vehicles to pass. When a pedestrian needs to cross the crosswalk, the pedestrian may press the pedestrian button to turn the traffic lights into a green light. In some embodiments, the traffic lights may be switched after a first preset time (for example, 2 seconds) after the pedestrian presses the pedestrian button.

In some embodiments, the management platform may also determine the target picture by screening multi-frame images in an initial picture. The initial picture refers to a continuous picture directly captured by the image obtaining device configured on the object platform. The management platform may select image frames at preset time intervals in the initial picture, use the selected image frames as target frames, and form the target picture in chronological order. Therefore, the time interval between two adjacent target frames in the initial picture is a preset time length. For example, the initial picture has a continuous picture of 30 seconds. The preset time length is 2 seconds. The management platform may use the image frames corresponding to the 0th second, the 2nd second, the 4th second . . . and the 30th second as the target frames to form the target picture. The time interval between two adjacent target frames in the initial picture is 2 seconds. When a screened initial picture is closer to the multi-frame images collected at the time point when the pedestrian button is pressed, the management platform may shorten the time interval between two adjacent target frames in the initial picture. That is, the closer the screened initial picture to the images collected at the time point when the pedestrian button is pressed, the more the target frames selected by the management platform may be.

Merely by way of example, the management platform may set a preset time interval between two adjacent target frames in the initial picture. Within a second preset time range (for example, 0~1 second) before and after the pedestrian button is pressed, the time interval between the two adjacent target frames in the initial picture may be reduced by 0.02 seconds on the basis of the preset time interval. Within a third preset time range (for example, 1-2 seconds) before and after the pedestrian button is pressed, the preset time interval between the two adjacent target frames in the initial picture may be reduced by 0.01 based on the preset time interval seconds. For example, the preset time interval between two adjacent target pictures in the initial frame may be 0.03 seconds. The time when the pedestrian presses the pedestrian button is 9:00:00. Then within the second preset time range, that is, within 8:59:59~9:00:01, the time interval between the two adjacent target frames images in the initial picture is 0.01 second. Within the third preset time range, that is, within 8:59:58~8:59:59 and 9:00:01~9:00:02, the time interval between the two adjacent target frames in the initial picture is 0.02 seconds.

The manner described in some embodiments of the present disclosure adopts the setting of shortening the time interval between two adjacent target frames in the initial picture to obtain the target picture when a time is closer to the time that the pedestrian button is pressed. Compared with taking all image frames as the target picture, this setting can collect the situation of pedestrians at the intersection in a targeted way, and reduce the amount of data analysis while ensuring the comprehensiveness of effective information, thereby determining the pedestrian information more quickly and accurately.

The manner described in some embodiments of the present disclosure can switch the traffic lights or adjust the lighting duration more flexibly by setting the pedestrian button so that pedestrians or vehicles can pass usually and avoid unnecessary waiting in the case of pedestrians or no one passing the crosswalk.

In some embodiments, the management platform may determine the pedestrian information of the target intersection based on the image recognition result of the target picture. The image recognition result may be obtained by analyzing and processing the target picture through convolutional neural network (CNN), Fisherfaces, Haar Cascade, and other algorithms.

The manner described in some embodiments of the present disclosure determines more accurate pedestrian information by performing image recognition on the target picture, which can facilitate the subsequent determination of a more reasonable scheme for setting the time and improving the passing rate of pedestrians and vehicles at the intersection.

In some embodiments, the pedestrian information may include a count of current pedestrians. The count of current pedestrians refers to a count of pedestrians at the target intersection at a current time.

In some embodiments, the management platform may perform face recognition on the collected target picture to obtain the count of current pedestrians.

In some embodiments, the management platform may determine a first count of pedestrians to be determined based on at least one real-time image through a pedestrian recognition model, determine a second count of pedestrians to be determined based on the multi-frame historical images through a first pedestrian prediction model, and determine the count of current pedestrians based on the first count of pedestrians to be determined and the second count of pedestrians to be determined. For more descriptions of determining the count of current pedestrians based on the first count of pedestrians to be determined and the second count of pedestrians to be determined, please refer to FIG. 3 and related descriptions thereof.

In some embodiments, the pedestrian information also includes a count of pedestrians at a plurality of future time points. For example, the count of pedestrians at 18:00 p.m. in the next two days may be 230 and 245. The count of pedestrians at 14:00 and 14:30 p.m. on the same day may be 23 and 56 respectively.

In some embodiments, the management platform may use preset rules, various data analysis algorithms, and/or human experience to determine the count of pedestrians at the plurality of future time points. For example, the management platform may generate a corresponding rule between the historical time point and the count of pedestrians at the historical time point based on the historical time point of the target intersection and the historical count of pedestrians at the historical time point in advance. Correspondingly, the management platform may determine the historical count of pedestrians corresponding to the historical time point same as or similar to the future time point as the count of pedestrians of the current target intersection at the plurality of future time points based on the future time point and corresponding rules.

In some embodiments, the management platform may determine the count of pedestrians at the plurality of future time points through a second pedestrian prediction model based on the multi-frame historical images of the target picture, the intersection information, event information, weather information and a target time period, and the second pedestrian prediction model is a machine learning model. For more descriptions of determining the count of pedestrians at the plurality of future time points through the second pedestrian prediction model, please refer to FIG. 5 and its related descriptions.

The manner described in some embodiments of the present disclosure may reflect the pedestrian situation at the intersection at the plurality of future time points through the count of pedestrians at the plurality of future time points, so as to facilitate subsequent determination of a more appropriate scheme for setting the time for traffic lights.

The intersection information refers to information reflecting the relevant situation of the target intersection. In some embodiments, the intersection information may at least include one or more of information such as intersection type, road width, and building information near the intersection. The intersection type may reflect the shape of the intersection. For example, the type of intersection may be a crossroad, a roundabout, a Y-junction, or the like. The road width may be the width of at least one road where the intersection is located. For example, the road width may be 20 meters, 10 meters and 25 meters, etc. The building information near the intersection may reflect the type and scale of the buildings near the intersection, for example, the building information may be a large shopping mall with a capacity of 5,000 people, an office building with a capacity of 1,000 people, a subway station with an average people flow of 300 people/min.

In some embodiments, the management platform may obtain the intersection information based on the object platform through the sensor network platform. For example, the object platform may pre-store the intersection information of each intersection. The management platform may issue instructions of obtaining the intersection information to the sensor network platform. The sensor network platform issues the instruction to the object platform. The object platform sends the intersection information to the sensor network platform in response to the instruction. The management platform may receive the intersection information uploaded by the sensor network platform.

Step 220, determining, based on the pedestrian information and the intersection information, a scheme for setting time of the traffic lights at the target intersection.

The scheme for setting the time refers to a scheme for setting the lighting duration of various indicator lights in the traffic lights in a lighting cycle. A lighting cycle may refer to total duration of lighting all the traffic lights once, for example, 30 seconds, 1 minute, and so on. For example, the scheme for setting the time may be that the lighting duration of the red light is 40 seconds, and the lighting duration of the green light is 30 seconds. As another example, the scheme for setting the time may also be that the lighting duration of the red light is 30 seconds, the lighting duration of the yellow light is 5 seconds, and the lighting duration of the green light is 20 seconds.

In some embodiments, the management platform may generate a mapping relationship among historical intersection information, historical pedestrian information, and historical scheme for setting the time based on the historical intersection information of the plurality of intersections, the historical pedestrian information of the plurality of intersections, and the historical scheme for setting the time of corresponding traffic lights. It should be understood that the management platform may determine the historical scheme for setting the time corresponding to the historical intersection information and historical pedestrian information that are the same as or similar to the current intersection information and pedestrian information as current predicted pedestrian data based on the current intersection information, current pedestrian information, and the mapping relationship.

In some embodiments, the management platform may determine the scheme for setting the time of the traffic lights at the target intersection through vector matching based on the pedestrian information and the intersection information. For more descriptions of determining the scheme for setting the time through vector matching, please refer to FIG. 6 and related descriptions thereof.

In some embodiments, the management platform may also determine the update frequency of the scheme for setting the time.

The update frequency refers to a count of updates per unit time of the scheme for setting the time. For example, the update frequency may be 1 update per minute, 1 update per day, etc.

In some embodiments, the management platform may determine the update frequency of the scheme for setting the time based on a pedestrian passing rate of the scheme for setting the time.

The pedestrian passing rate refers to a proportion of pedestrians passing through the intersection to the total count of pedestrians at the target intersection before the red light turns on in a lighting cycle. For example, if the total count of pedestrians is 120 and the count of pedestrians passing through the intersection is 45, the passing rate of pedestrians is 45/120=37.5%.

In some embodiments, the management platform may use the actual pedestrian passing rate of a certain scheme for setting the time as the pedestrian passing rate corresponding to the scheme for setting the time. The management platform may calculate an average value of a plurality of pedestrian passing rates corresponding to the same scheme for setting the time in a plurality of historical lighting cycles and use the average value of the plurality of pedestrian passing rates as the actual pedestrian passing rate.

In some embodiments, when the pedestrian passing rate is within a certain preset range, the management platform may determine the update frequency corresponding to the scheme for setting the time within the preset range according to the preset range of the pedestrian passing rate. Merely by way of example, when the pedestrian passing rate is between 0% and 30%, the update frequency of the scheme for setting the time may be once every 12 hours. When the pedestrian passing rate is between 30% and 60%, the update frequency of the scheme for setting the time may be once a day. When the pedestrian passing rate is greater than 60%, the update frequency of the scheme for setting the time may be once a week. It should be understood that the higher the pedestrian passing rate is, the more reasonable the setting of the scheme for setting the time is, and the lower the update frequency of the scheme for setting the time may be.

In some embodiments, the management platform may determine the update frequency of the scheme for setting the time based on a degree of change in the count of pedestrians. The degree of change in the count of pedestrians may reflect the fluctuation of the count of pedestrians. In some embodiments, the degree of change in the count of pedestrians may be represented by the standard deviation of the count of pedestrians. For example, at the time of $T_1, T_2, \ldots, T_n$, the count of pedestrians is $S_1, S_2, \ldots, S_n$, then the degree of change of the count of pedestrians can be the standard deviation of $S_1, S_2, \ldots, S_n$.

In some embodiments, the management platform may preset the correspondence (e.g., one-to-one correspondence, quantitative relationship, etc.) between the degree of change in the count of pedestrians and the update frequency. The management platform may determine the update frequency of the scheme for setting the time based on the degree of change in the count of current pedestrians and the corresponding relationship between the degree of change in the count of pedestrians and the update frequency. It should be understood that the smaller the degree of change in the count of pedestrians is, the more stable the count of pedestrians is, and the lower the update frequency of the scheme for setting the time may be.

In the manner described in some embodiments of the present disclosure, the update frequency of the scheme for setting the time is set according to the actual situation of the count of pedestrians. Compared with a single replacement frequency, this manner can quickly respond to the actual situation of the count of pedestrians at the target intersection, thereby updating the scheme for setting the time and avoiding congestion at the target intersection.

Step 230, sending a control instruction corresponding to the scheme for setting the time to the object platform through the sensor network platform, and in response to the received control instruction, controlling lighting duration of the traffic lights by the object platform. The control instruction may include the control information of the lighting duration in the scheme for setting the time.

In some embodiments, the object platform may adjust the lighting duration of the traffic lights according to the control information in the control instruction in response to the received control instruction.

In some embodiments, the management platform may also adjust the lighting duration of the traffic lights or switch the traffic lights through the pedestrian button disposed on the object platform. For more instructions on adjusting the lighting duration of the traffic light or switching the traffic light through the pedestrian button, please refer to the aforementioned step 220 and related descriptions thereof.

The manner described in some embodiments of the present disclosure determines an appropriate scheme for setting the time by obtaining pedestrian information and intersection information of the target intersection, so as to optimize the lighting duration of the traffic lights, improve the passing efficiency of pedestrians and vehicles at the intersection, avoid intersection congestion, and ensure the smoothness of the intersection.

Figure 3:
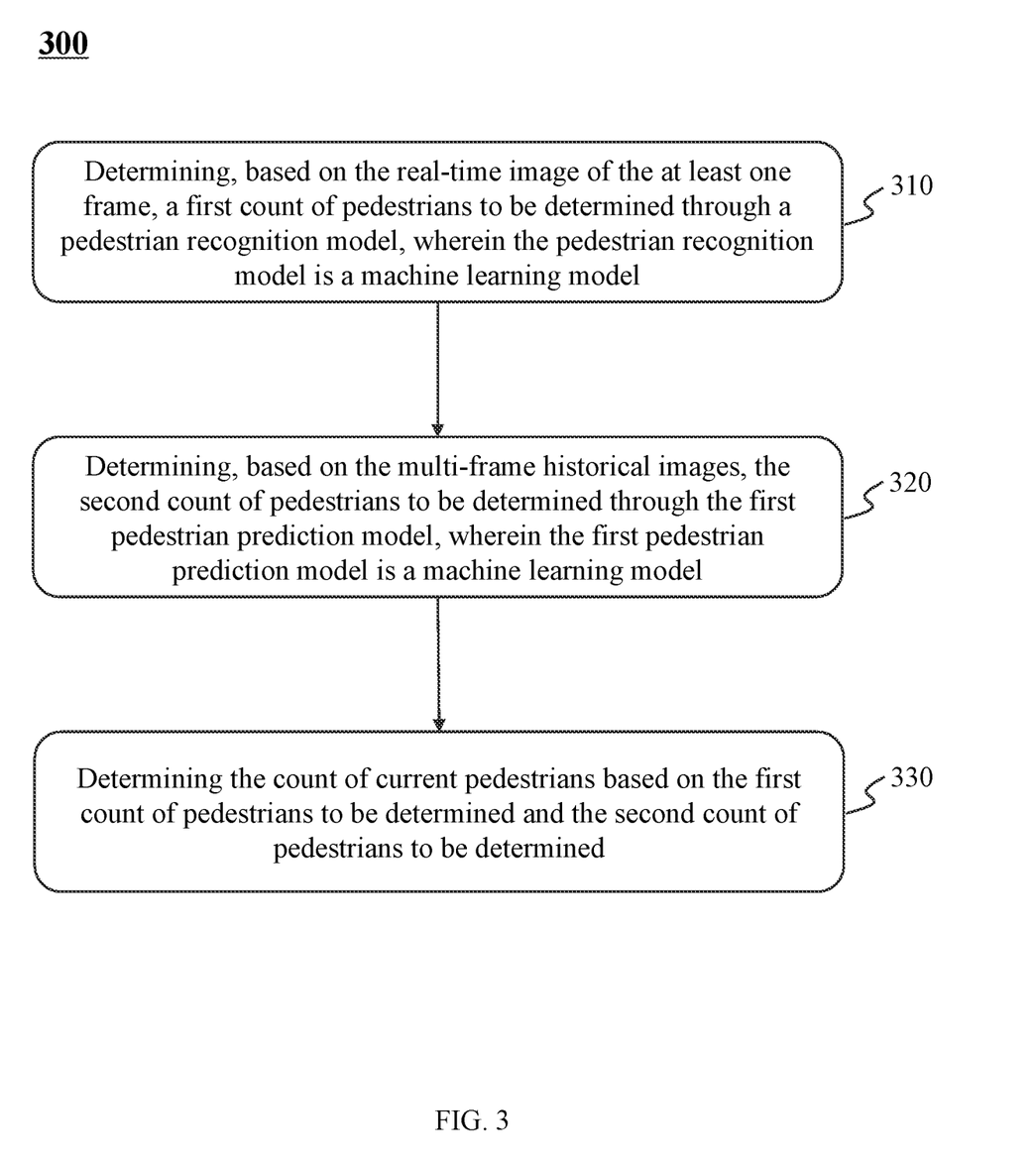
FIG. 3 is a flowchart illustrating an exemplary process for determining a count of current pedestrians according to some embodiments of the present disclosure.

FIG. 3 is a flowchart illustrating an exemplary process for determining a count of current pedestrians according to some embodiments of the present disclosure. As shown in FIG. 3, a process 300 includes the following steps. In some embodiments, the process 300 may be executed by the management platform.

Step 310, determining, based on the real-time image of the at least one frame, a first count of pedestrians to be determined through a pedestrian recognition model, wherein the pedestrian recognition model is a machine learning model.

The first count of pedestrians to be determined refers to the count of current pedestrians determined after the real-time image is identified and processed.

The pedestrian recognition model may be used to process the real-time image of at least one frame to determine the first count of pedestrians to be determined. The pedestrian recognition model may be a You Only Look Once (YOLO) model.

Figure 4:
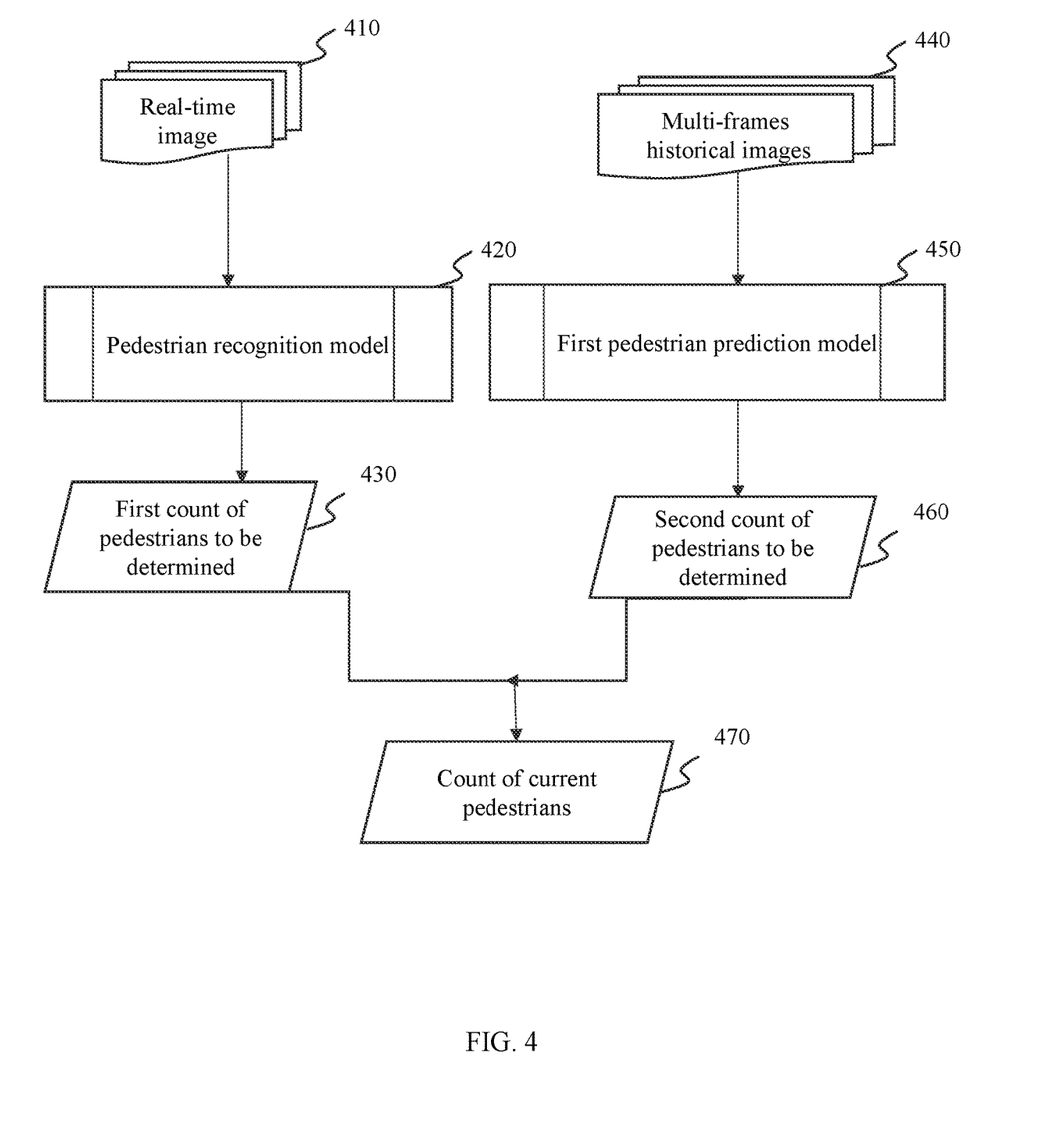
FIG. 4 is a schematic diagram illustrating an exemplary process for determining the count of current pedestrians through a pedestrian recognition model and a first pedestrian prediction model according to some embodiments of the present disclosure.

FIG. 4 is a schematic diagram illustrating an exemplary process for determining the count of current pedestrians through a pedestrian recognition model and a first pedestrian prediction model according to some embodiments of the present disclosure. As shown in FIG. 4, an input of the pedestrian recognition model 420 may include the real-time image 410 of at least one frame. An output of the pedestrian recognition model 420 may be the first count of pedestrians to be determined 430.

In some embodiments, the parameters of the pedestrian recognition model may be obtained through training. The management platform may train the initial pedestrian recognition model based on a plurality of groups of first training samples with labels. The first training samples may be sample images of sample intersections, and the labels of the first training samples may be the actual count of pedestrians in the sample images. It should be understood that the sample intersection in the first training sample should be the target intersection or other intersections having the same intersection information as the target intersection. The label may be obtained by annotating the determined count of pedestrians in the sample images manually.

The plurality of first training samples are input into the initial pedestrian recognition model to construct a loss function based on the output of the initial pedestrian recognition model and the labels of the first training samples, and the parameters of the initial pedestrian recognition model are iteratively updated based on the loss function. When the trained model satisfies a first preset condition, the training is finished, and the trained pedestrian recognition model is obtained. The first preset condition may include, but may be not limited to, loss function convergence, loss function value less than a preset value, or the count of training iterations reaching a threshold, or the like.

Step 320, determining, based on the multi-frame historical images, the second count of pedestrians to be determined through the first pedestrian prediction model, wherein the first pedestrian prediction model is a machine learning model.

The second count of pedestrians to be determined refers to a count of current pedestrians predicted after the historical image is predicted.

The first pedestrian prediction model may be used to process the multi-frame historical images to determine the second count of pedestrians to be determined. The first pedestrian prediction model may be convolutional neural networks (CNN).

As shown in FIG. 4, an input of the first pedestrian prediction model 450 may include multi-frame historical images 440. An output of the first pedestrian prediction model 450 may be a second count of pedestrians to be determined 460.

In some embodiments, the parameters of the first pedestrian prediction model may be obtained through training. The management platform may train an initial first pedestrian prediction model based on a plurality of sets of second training samples with labels. The second training sample may be a plurality of sample images of a sample intersection at a plurality of first sample times, and the label of the second training sample may be an actual count of pedestrians at the sample intersection at the second sample time.

It should be understood that the first sample time is earlier than the second sample time. The label may be obtained by marking and counting the count of pedestrians in the image corresponding to the sample intersection at the second sample time manually. More descriptions about the training process may be found in the foregoing descriptions of the training of the pedestrian recognition model.

Step 330, determining the count of current pedestrians based on the first count of pedestrians to be determined and the second count of pedestrians to be determined.

As shown in FIG. 4, the management platform may process the first count of pedestrians to be determined 430 and the second count of pedestrians to be determined 460 to determine the count of current pedestrians 470. For example, the management platform may calculate the average of the first count of pedestrians to be determined and the second count of pedestrians to be determined to determine the count of current pedestrians.

In some embodiments, the management platform may determine the count of current pedestrians based on a weighted sum of the first count of pedestrians to be determined and the second count of pedestrians to be determined, wherein the weights of the first count of pedestrians to be determined and the second count of pedestrians to be determined are determined based on the clarity of the real-time image and the historical images, respectively, and the weights are positively related to the clarity. The clarity of real-time images and historical images may be obtained by the management platform through clear quantitative analysis (such as Brenner function analysis method, Fourier transform analysis method, etc.). The count of current pedestrians may be calculated by formula (1):

$$N = p*M_1 + q*M_2 \qquad (1),$$

where N is the count of current pedestrians, $M_1$ is the first count of pedestrians to be determined, and $M_2$ is the second count of pedestrians to be determined. p and q are weights corresponding to the first count of pedestrians to be determined and the second count of pedestrians to be determined.

In some embodiments, the management platform may preset the weight and clarity corresponding to the first count of pedestrians to be determined and the second count of pedestrians to be determined to satisfy the quantitative relationship. For example, the quantitative relationship may be determined by the following formula (2):

$$\begin{cases} p = k_1 * D_1 \\ q = k_2 * D_2 \\ p + q = 1 \end{cases} \qquad (2)$$

where $D_1$ is the clarity of the real-time image, $D_2$ is the clarity of the historical image, $k_1$ and $k_2$ are preset constants. For example, $k_1$ and $k_2$ may be system default values, experience values, artificial preset values, or the like, or any combination thereof, and may be set according to actual needs.

For example, $D_1=30$, $D_2=40$. The management platform may pre-set $k_1=0.012$ and $k_2=0.016$, according to formula (2), p=0.012*30=0.36, q=0.016*40=0.64. Therefore, the weights corresponding to the first count of pedestrians to be determined and the second count of pedestrians to be determined are 0.36 and 0.64 respectively.

In some embodiments, the management platform may also preset the respective weights of the first count of pedestrians to be determined and the second count of pedestrians to be determined, and form a corresponding relationship among the respective weights of the first count of pedestrians to be determined and the second count of pedestrians to be determined, the clarity difference between the real-time image and the historical images, and the range where the difference lies. For example, when the clarity difference between the real-time image and the historical image is between 0 and 50, and the clarity of the real-time image is greater than that of the historical image, the weights of the first count of pedestrians to be determined and the second count of pedestrians to be determined are 0.6 and 0.4, respectively; conversely, when the clarity of the real-time image is less than that of the historical image, the weights of the first count of pedestrians to be determined and the second count of pedestrians to be determined are 0.4 and 0.6, respectively. When the clarity difference between the real-time image and the historical image is greater than 50, and the clarity of the real-time image is greater than that of the historical image, the weights of the first count of pedestrians to be determined and the second count of pedestrians to be determined are 0.8 and 0.2, respectively; conversely, when the clarity of the real-time image is less than that of the historical image, the weights of the first count of pedestrians to be determined and the second count of pedestrians to be determined are 0.2 and 0.8, respectively.

In some embodiments, the weight of the second count of pedestrians to be determined may be determined based on the pixel difference between each frame of the multi-frame historical images, and the pixel difference is negatively correlated with the weight of the second count of pedestrians to be determined. It should be understood that when the pixel difference between each frame of the multi-frame historical images is greater, it means that the degree of change of the historical images is greater, and the accuracy of the predicted second count of pedestrians to be determined is lower. Therefore, the management platform needs to reduce the impact of the second count of pedestrians to be determined on the final result, that is, reduce the weight corresponding to the second count of pedestrians to be determined.

In some embodiments, within a fourth preset time after the button is pressed, the management platform may determine that the weight of the first count of pedestrians to be determined may be greater than the weight of the second count of pedestrians to be determined. For example, the fourth preset time is 5 minutes. The management platform may preset that within 5 minutes after the button is pressed at the current time, the weight of the first count of pedestrians to be determined is 0.7, and the weight of the second count of pedestrians to be determined is 0.3. It should be understood that when a pedestrian presses the pedestrian button, it means that there is a pedestrian at the intersection. Therefore, real-time images are more critical to obtain accurate current count of pedestrian. The management platform may correspondingly increase the weight of the first count of pedestrians to be determined to obtain a more accurate count of current pedestrians.

In some embodiments of the present disclosure, different weights may be determined according to differences in the clarity of the real-time image and the historical images, which reduces errors and thus can determine the current count of pedestrians more accurately.

The manner described in some embodiments of the present disclosure can determine a more accurate count of current pedestrians through a comprehensive analysis of real-time images and the multi-frame historical images, so as to reflect the pedestrian information of the intersection at the current time, so as to facilitate subsequent determination of a more suitable scheme for setting the time of traffic lights.

Figure 5:
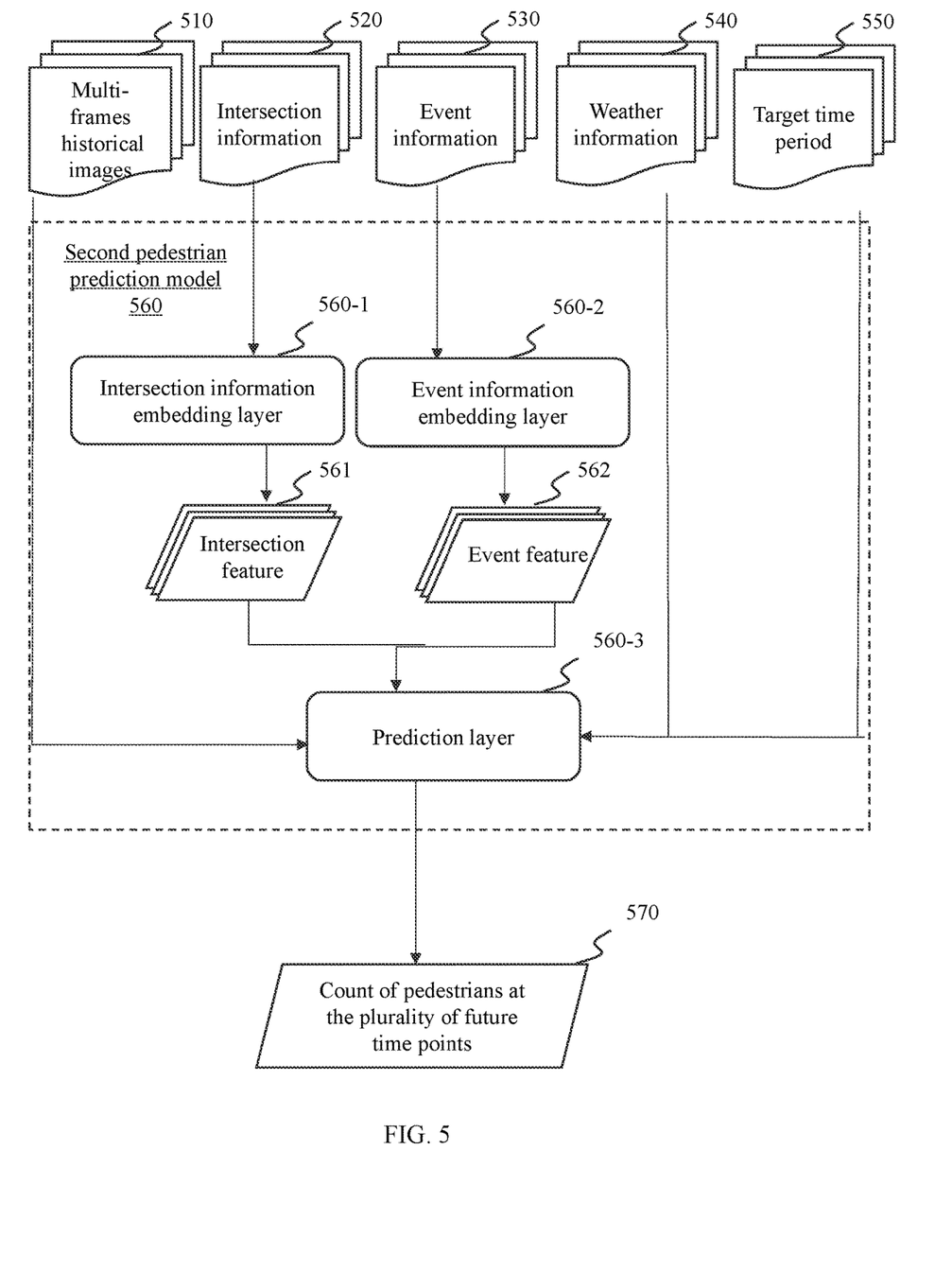
FIG. 5 is a schematic diagram illustrating an exemplary process for determining a count of pedestrians at a plurality of future time points through a second pedestrian prediction model according to some embodiments of the present disclosure.

FIG. 5 is a schematic diagram illustrating an exemplary process for determining a count of pedestrians at a plurality of future time points through a second pedestrian prediction model according to some embodiments of the present disclosure.

In some embodiments, the management platform may determine the count of pedestrians at the plurality of future time points through a second pedestrian prediction model based on multi-frame historical images of the target picture, the intersection Information, event information, weather information, and a target time period, and the second pedestrian prediction model is a machine learning model.

The target time period is a time period in which the count of future pedestrians needs to be determined. The target time period may be at least one time period in the future. For example, the target time period may be the next 2 hours, the rush hours every day in the next week, 18:00~19:00 on Jun. 30, 2023, etc. In some embodiments, the target time period may include a plurality of future time points.

The event information refers to information about large-scale events (such as exhibitions, concerts, etc.) near the intersection in the target time period. The event information may include the time of the event (for example, at 15:00 on September 21), the location of the event (for example, a stadium), and the scale of the event (for example, 3000 people). In some embodiments, the event information may be determined from public event information.

The weather information refers to information of the weather conditions near the intersection in the target time period, for example, heavy rain, light rain, snowfall, sunny weather, or the like. In some embodiments, the weather information may be determined based on weather forecasts.

The second pedestrian prediction model may be used to analyze the multi-frame historical images, intersection information, event information, weather information, and target time periods to determine the count of pedestrians at the plurality of future time points. The second pedestrian prediction model may be a combination of one or more of a Transformer model, a convolutional neural network model, a deep neural network model, or the like.

As shown in FIG. 5, an input of the second pedestrian prediction model 560 may include the multi-frame historical images 510, intersection information 520, event information 530, weather information 540, and target time period 550, and an output of the second pedestrian prediction model 560 may be the count of pedestrians at the plurality of future time points 570.

In some embodiments, the parameters of the second pedestrian prediction model may be obtained through training. The management platform may train an initial second pedestrian prediction model based on a plurality of groups of third training samples with labels, which may include intersection information of a sample intersection, a plurality of sample images at a first sample time, event information at a second sample time, weather information at the second sample time, and the second sample time, and the label of the third training sample may be the actual count of pedestrians at the sample intersection at the second sample time. The label may be obtained by manually marking and counting the count of pedestrians in the image corresponding to the sample intersection at the second sample time. More descriptions about the training process may be found in the foregoing description of the training of the pedestrian recognition model.

As shown in FIG. 5, the second pedestrian prediction model 560 includes an intersection information embedding layer 560-1, an event information embedding layer 560-2, and a prediction layer 560-3.

The intersection information embedding layer 560-1 may process the intersection information and determine intersection features. The intersection features refer to features obtained after feature extraction of intersection information. In some embodiments, the intersection information embedding layer 560-1 may be a convolutional neural network. As shown in FIG. 5, the input of the intersection information embedding layer 560-1 may be intersection information 520, and the output of the intersection information embedding layer 560-1 may be intersection feature 561.

The event information embedding layer 560-2 may process the event information and determine event features. The event features refer to features obtained after feature extraction of the event information. In some embodiments, the event information embedding layer 560-2 may be a convolutional neural network. As shown in FIG. 5, the input of the event information embedding layer 560-2 may be event information 530, and the output of the event information embedding layer 560-2 may be event feature 562.

The prediction layer 560-3 may analyze and process the multi-frame historical images, intersection features, event features, weather information, and target time periods to determine the count of pedestrians at the plurality of future time points. As shown in FIG. 5, the input of the prediction layer 560-3 may be the intersection feature 561 obtained based on the intersection information embedding layer 560-1, the event feature 562 obtained based on the event information embedding layer 560-2, the multi-frame historical images 510, the weather information 540, the target time period 550, and the output may be the count of pedestrians at the plurality of future time points 570. In some embodiments, the prediction layer may be one or a combination of convolutional neural networks, deep neural networks, or the like.

In some embodiments, the intersection information embedding layer, event information embedding layer, and prediction layer may be obtained by jointly training an initial pedestrian recognition model based on the third training sample and a label of the third training sample.

In some embodiments, the management platform may also use a fifth preset time before the time point when the pedestrian presses the pedestrian button as the first sample time, and use the image at the fifth preset time as a sample image. The management platform may take the time points when the pedestrian presses the pedestrian button and a plurality of time points in the sixth preset time after the pedestrian presses the pedestrian button as the second sample time, and take the count of pedestrians corresponding to the time points when the pedestrian presses the pedestrian button and the plurality of time points in the sixth preset time after it as the label corresponding to the third training sample. It should be understood that when a pedestrian presses the pedestrian button, it means that there is a pedestrian at the intersection. The management platform obtains third training samples and labels based on the images before and after the pedestrian presses the pedestrian button, which improves the efficiency of training samples and labels.

In some embodiments, the label corresponding to the third training sample may be obtained by manually marking and counting the count of pedestrians in the image corresponding to the sample intersection at the second sample time. In some embodiments, the label corresponding to the third training sample may be determined based on the image of at least one frame. The images of at least one frame may be determined by the discontinuous collection of the object platform within the second sample time, or may be determined by selecting at least one frame from the image corresponding to the second sample time. For example, the images of at least one frame may be images of one or more frames corresponding to a time point when the pedestrian presses the pedestrian button. As another example, the images of at least one frame may be images of one or more frames corresponding to a time point when the traffic light is green. In some embodiments of the present disclosure, there is no need to perform statistics on each frame of images, thereby saving label obtaining time and reducing label obtaining costs.

In a joint training, the management platform may input the intersection information of the sample intersection in the third training sample into an initial intersection information embedding layer, and input the event information of the second sample time in the third training sample into an initial event information embedding layer. Then, the output of the initial intersection information embedding layer, the output of the initial event information embedding layer, the plurality of sample images, the weather information of the second sample time and the second sample time are input into the initial prediction layer together, a loss function is constructed based on the output of the initial prediction layer and labels. The parameters of each layer in the initial second pedestrian prediction model are iteratively updated based on the loss function, so that the loss function of the model meets a preset condition, and a trained second pedestrian prediction model is obtained. The preset condition may include but not limited to the convergence of the loss function, the value of the loss function less than a preset value, or the count of training iterations reaching a threshold.

The manner described in some embodiments of the present disclosure analyze and process historical images and possible situations (such as the intersection information, the event information, the weather information, and the target time period) which may affect the count of pedestrians in the future, which can quickly and accurately predict the count of pedestrians at the plurality of future time points in the target time period and is convenient for subsequent determination of the scheme for setting the time.

Figure 6:
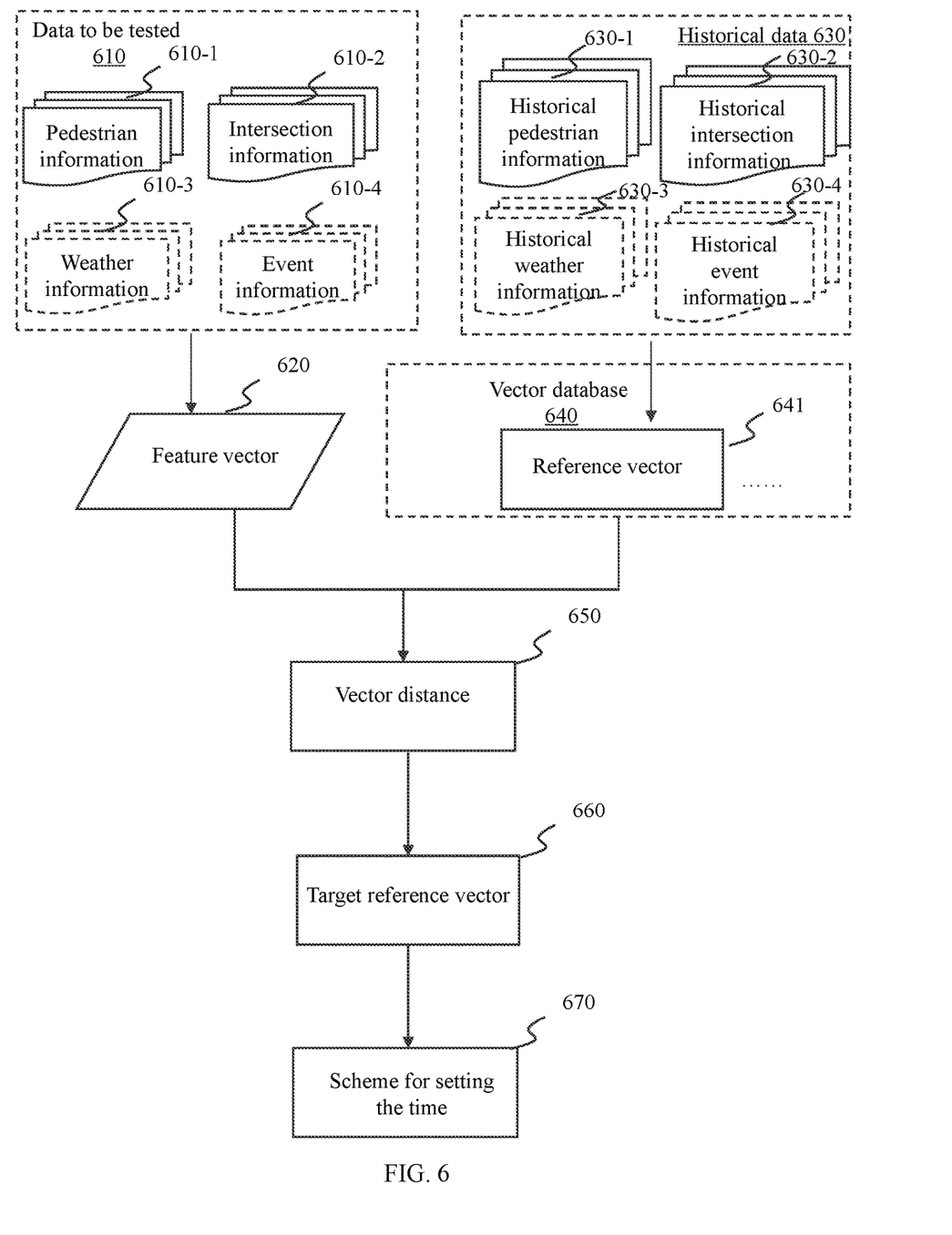
FIG. 6 is a schematic diagram illustrating an exemplary process for determining a scheme for setting time of the traffic lights at a target intersection through vector matching according to some embodiments of the present disclosure.

FIG. 6 is a schematic diagram illustrating an exemplary process for determining a scheme for setting time of the traffic lights at a target intersection through vector matching according to some embodiments of the present disclosure.

In some embodiments, the management platform may determine, based on the pedestrian information and the intersection information, a scheme for setting time of the traffic lights at the target intersection through vector matching. As shown in FIG. 6, the exemplary process of determining the scheme for setting the time based on vector matching is as follows.

In some embodiments, the management platform may construct a feature vector 620 based on the data to be tested 610. The data to be tested 610 includes pedestrian information 610-1 and intersection information 610-2. Merely by way of example, the feature vector may be expressed as [a, b, c, . . . ], where element a may represent pedestrian information (for example, when the count of pedestrians is between 0 and 100, the corresponding a may be 1, and when the count of pedestrians is between 100 and 200, the corresponding a may be 2, . . . ). Element b may represent the intersection type (for example, when the intersection type is a crossroad, the corresponding b may be 1, when the intersection type is a roundabout, the corresponding b may be 2, when the intersection type is a Y-shaped intersection, the corresponding b may be 3, etc.). Element c may represent the road width (for example, when the road width is 0-5 meters, c may be 1; when the road width is 5-10 meters, c may be 2; when the road width is 10-15 meters, c may be for 3, etc.).

In some embodiments, the management platform may construct a reference vector 641 based on the historical data 630 of each intersection, and form a vector database 640 based on the reference vector 641. The way to construct the reference vector is similar to the way to construct the feature vector. In some embodiments, the historical data 630 may include historical pedestrian information 630-1 and historical intersection information 630-2.

In some embodiments, the management platform may also construct a feature vector 620 based on the pedestrian information 610-1, intersection information 610-2, weather information 610-3, and event information 610-4. Correspondingly, the management platform may construct the reference vector 641 based on historical pedestrian information 630-1, historical intersection information 630-2, historical weather information 630-3, and historical event information 630-4.

In some embodiments, each reference vector may correspond to a historical scheme for setting the time. It should be understood that the historical scheme for setting the time may be the actual lighting duration of various indicator lights of the traffic lights corresponding to historical situations such as historical pedestrian information and historical intersection information represented by the reference vector.

In some embodiments, the management platform may calculate a vector distance 650 between the feature vector 620 and the reference vector 641 in the vector database 640. The vector distance may be a Euclidean distance, a cosine distance, a Mahalanobis distance, a Chebyshev distance, a Manhattan distance, etc.

In some embodiments, the management platform may filter the reference vectors 641 based on the vector distance 650 to determine at least one target reference vector 660. For example, the management platform may select the reference vector with the smallest vector distance from the feature vector as the target reference vector. As another example, the management platform may use one or more reference vectors whose vector distance is smaller than a threshold (e.g., 2) as the target reference vector.

In some embodiments, the management platform may determine the scheme for setting the time 670 based on the target reference vector 660.

In some embodiments, when a target reference vector is determined, the management platform may directly use the scheme for setting the time corresponding to the target reference vector as the final scheme for setting the time.

In some embodiments, when a plurality of target reference vectors are determined, the management platform may respectively average the lighting duration of the same indicator lights contained in the plurality of target reference vectors in the schemes for setting the time corresponding to the plurality of target reference vectors, and take the average value as the final scheme for setting the time. Merely by way of example, the management platform determines the target reference vector B and the target reference vector C. The scheme for setting the time corresponding to the target reference vector B is that the lighting duration of the red light is 40 seconds, and the lighting duration of the green light is 20 seconds. The scheme for setting the time corresponding to the target reference vector B is that the lighting duration of the red light is 30 seconds, and the lighting duration of the green light is 30 seconds. The management platform may average the lighting duration corresponding to the same indicator lights in the above two schemes for setting the time. The final scheme for setting the time may be that the lighting duration of the red light is 35 seconds, and the lighting duration of the green light is 25 seconds.

In some embodiments, when the plurality of target reference vectors are determined, the management platform may also determine the scheme for setting the time corresponding to the highest pedestrian passing rate among the plurality of schemes for setting the time corresponding to the plurality of target reference vectors as the final scheme for setting the time. For more descriptions about the pedestrian passing rate, please refer to the aforementioned FIG. 2 and its related descriptions. Merely by way of example, the management platform determines the target reference vector D and the target reference vector E. The pedestrian passing rate of the scheme for setting the time corresponding to the target reference vector D is 89%. The pedestrian passing rate of the scheme for setting the time corresponding to the target reference vector E is 93%. Then the management platform may determine that the final scheme for setting the time is the scheme for setting the time corresponding to the target reference vector E.

In some embodiments of the present disclosure, a more reasonable scheme for setting the time may be determined by combining the pedestrian passing rate to filter the target reference vector.

In some embodiments of the present disclosure, the management platform may use historical data as a reference and combine historical actual conditions to determine a more appropriate scheme for setting the time through vector matching, so as to avoid the congestion at the intersection.

The embodiment of the present disclosure also provides a non-transitory computer-readable storage medium storing computer instructions, and when reading the computer instructions in the storage medium, a computer executes the method for setting the time of traffic lights in the smart city according to the embodiments.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure.

What is claimed is:

1. A method for setting time of traffic lights in a smart city, wherein the method is implemented by an Internet of Things system for setting time of traffic lights in a smart city, which includes a user platform, a service platform, a management platform, a sensor network platform, and an object platform, the management platform includes a processor, the service platform is part of a processing device or implemented by the processing device, and the method is executed by the management platform, comprising:
   obtaining pedestrian information and intersection information of a target intersection through the sensor network platform based on the object platform, and the target intersection being an intersection provided with the traffic lights;
   determining, based on the pedestrian information and the intersection information, a scheme for setting time of the traffic lights at the target intersection;
   sending a control instruction corresponding to the scheme for setting the time to the object platform through the sensor network platform, and in response to the received control instruction, controlling lighting duration of the traffic lights by the object platform; and
   determining an update frequency of the scheme for setting the time.

2. The method according to claim 1, wherein the management platform includes a plurality of management sub-platforms.

3. The method according to claim 2, wherein the sensor network platform includes a plurality of sensor network sub-platforms; and each of the plurality of sensor network sub-platforms is in one-to-one correspondence with each of the plurality of management sub-platforms.

4. The method according to claim 1, wherein the obtaining pedestrian information of a target intersection based on the object platform includes:
   obtaining a target picture of the target intersection through the object platform; and
   determining the pedestrian information of the target intersection based on an image recognition result of the target picture.

5. The method according to claim 4, wherein the object platform includes a pedestrian button disposed near a crosswalk, and the pedestrian button is used to adjust the lighting duration of the traffic lights.

6. The method according to claim 4, wherein the target picture includes a real-time image of at least one frame and multi-frame historical images;
   the pedestrian information includes a count of current pedestrians; and
   a process of determining the count of current pedestrians includes:
      determining, based on the real-time image of the at least one frame, a first count of pedestrians to be determined through a pedestrian recognition model, wherein the pedestrian recognition model is a machine learning model;
      determining, based on the multi-frame historical images, through a first pedestrian prediction model, a second count of pedestrians to be determined, wherein the first pedestrian prediction model is a machine learning model; and
      determining the count of current pedestrians based on the first count of pedestrians to be determined and the second count of pedestrians to be determined.

7. The method according to claim 6, wherein the determining the count of current pedestrians based on the first count of pedestrians to be determined and the second count of pedestrians to be determined includes:

determining the count of current pedestrians based on a weighted sum of the first count of pedestrians to be determined and the second count of pedestrians to be determined, wherein weights of the first count of pedestrians to be determined and the second count of pedestrians to be determined are determined based on clarity of the real-time image and the historical images, respectively, and the weights are positively correlated with the clarity.

8. The method according to claim 6, wherein the first pedestrian prediction model is obtained through training, training samples are a plurality of historical images at a first sample time, a label is an actual count of pedestrians at a second sample time, and the first sample time is earlier than the second sample time.

9. The method according to claim 4, wherein the pedestrian information includes a count of pedestrians at a plurality of future time points.

10. The method according to claim 9, wherein determining the count of pedestrians at the plurality of future time points includes: determining, based on multi-frame historical images of the target picture, the intersection Information, event information, weather information, and a target time period, the count of pedestrians at the plurality of future time points through a second pedestrian prediction model, and the second pedestrian prediction model being a machine learning model.

11. The method according to claim 1, wherein the determining, based on the pedestrian information and the intersection information, a scheme for setting time of the traffic lights at the target intersection includes:
determining, based on the pedestrian information and the intersection information, the scheme for setting the time of the traffic lights at the target intersection through vector matching.

12. An Internet of Things system for setting time of traffic lights in a smart city, wherein the Internet of Things system comprises a user platform, a service platform, a management platform, a sensor network platform, and an object platform, the management platform includes a processor, the service platform is part of a processing device or implemented by the processing device, and the management platform is configured to:
obtain pedestrian information and intersection information of a target intersection through the sensor network platform based on the object platform, and the target intersection being an intersection provided with the traffic lights;
determine, based on pedestrian information and the intersection information, a scheme for setting time of the traffic lights at the target intersection;
send a control instruction corresponding to the scheme for setting the time to the object platform through the sensor network platform; and in response to the received control instruction, the object platform is configured to control lighting duration of the traffic lights; and
determine an update frequency of the scheme for setting the time.

13. The Internet of things system according to claim 12, wherein the management platform includes a plurality of management sub-platforms.

14. The Internet of things system according to claim 13, wherein the sensor network platform includes a plurality of sensor network sub-platforms; and each of the plurality of sensor network sub-platforms is in one-to-one correspondence with each of the plurality of management sub-platforms.

15. The Internet of Things system according to claim 12, wherein the management platform is configured to:
obtain a target picture of the target intersection through the object platform; and
determine the pedestrian information of the target intersection based on an image recognition result of the target picture.

16. The Internet of Things system according to claim 13, wherein the object platform includes a pedestrian button disposed near a crosswalk, and the pedestrian button is used to adjust the lighting duration of the traffic lights.

17. The Internet of Things system according to claim 15, wherein the target picture includes a real-time image of at least one frame and multi-frame historical images;
the pedestrian information includes a count of current pedestrians; and
the management platform is further configured to:
determine, based on the real-time image of the at least one frame, a first count of pedestrians to be determined through a pedestrian recognition model, wherein the pedestrian recognition model is a machine learning model;
determine, based on the multi-frame historical images, a second count of pedestrians to be determined through a first pedestrian prediction model, wherein the first pedestrian prediction model is a machine learning model; and
determine the count of current pedestrians based on the first count of pedestrians to be determined and the second count of pedestrians to be determined.

18. The Internet of Things system according to claim 17, wherein the management platform is configured to:
determine the count of current pedestrians based on a weighted sum of the first count of pedestrians to be determined and the second count of pedestrians to be determined, wherein weights of the first count of pedestrians to be determined and the second count of pedestrians to be determined are determined based on clarity of the real-time image and the historical image, respectively, and the weights are positively correlated with the clarity.

19. A non-transitory computer-readable storage medium, wherein the storage medium stores computer instructions, wherein when reading the computer instructions in the storage medium, a computer executes the method for setting the time of traffic lights in the smart city according to claim 1.

* * * * *